United States Patent [19]
Lee

[11] Patent Number: 5,943,451
[45] Date of Patent: Aug. 24, 1999

[54] IMAGE SCANNER WITH AUTOMATIC MOVING FUNCTION AND AUTOMATIC SHEET FEEDING FUNCTION

[75] Inventor: Carl Lee, Hsin-Chu, Taiwan

[73] Assignee: Mustek Systems, Inc., Hsin-Chu, Taiwan

[21] Appl. No.: 08/865,681

[22] Filed: May 30, 1997

[51] Int. Cl.⁶ .............................. H04N 1/04; H04N 1/024
[52] U.S. Cl. ..................... 382/313; 358/473; 358/474; 358/496; 358/497; 358/498; 382/312
[58] Field of Search .................................. 358/474, 498, 358/497, 496, 494, 401, 473; 271/3.14; 382/312

[56] References Cited

U.S. PATENT DOCUMENTS

| | | | |
|---|---|---|---|
| 5,739,923 | 4/1998 | Kawahara | 358/473 |
| 5,751,446 | 5/1998 | Fujioka | 358/474 |
| 5,764,382 | 6/1998 | Shiraishi | 358/496 |
| 5,801,851 | 9/1998 | Sheng | 358/497 |
| 5,805,431 | 2/1999 | Ma | 358/473 |

*Primary Examiner*—Edward L. Coles
*Assistant Examiner*—Cheukfan Lee
*Attorney, Agent, or Firm*—Bacon & Thomas PLLC

[57] ABSTRACT

An image scanner having automatic moving function and comprising a contact image sensor (CIS) is disclosed. The image scanner includes an upper base and a lower base, the upper and lower bases are put together during sheet-feeding process, while they are separated during automatic moving process in which only the upper base is utilized, smooth feeding of documents can be assured by using a specially designed sheet-feeding mechanism.

13 Claims, 7 Drawing Sheets

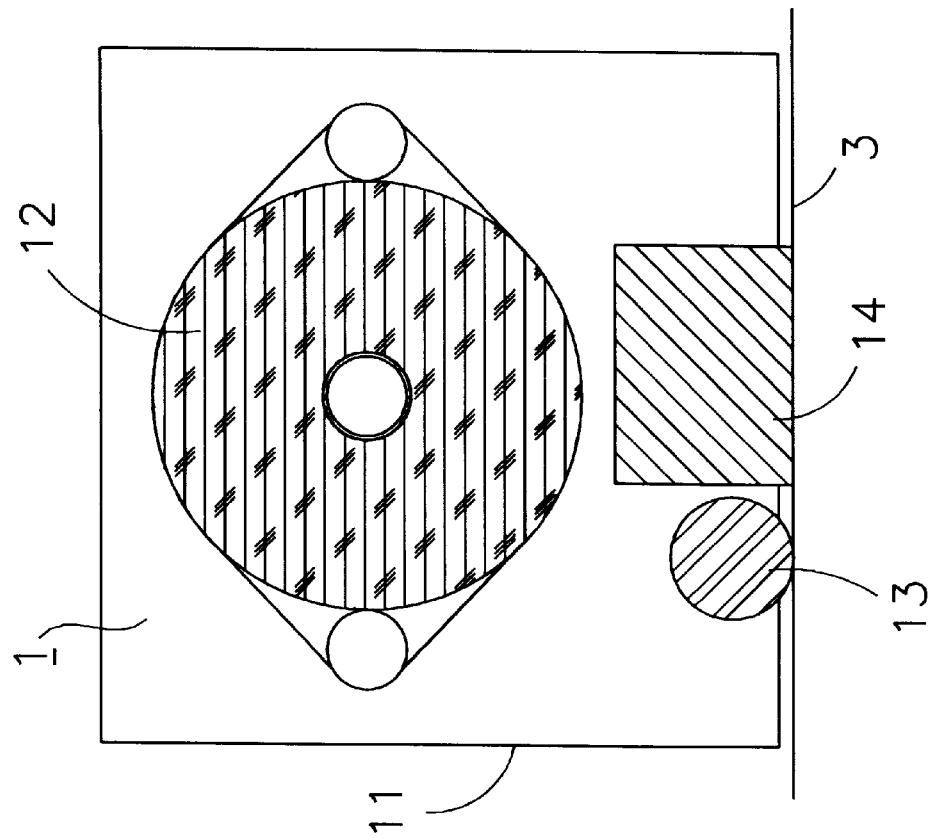
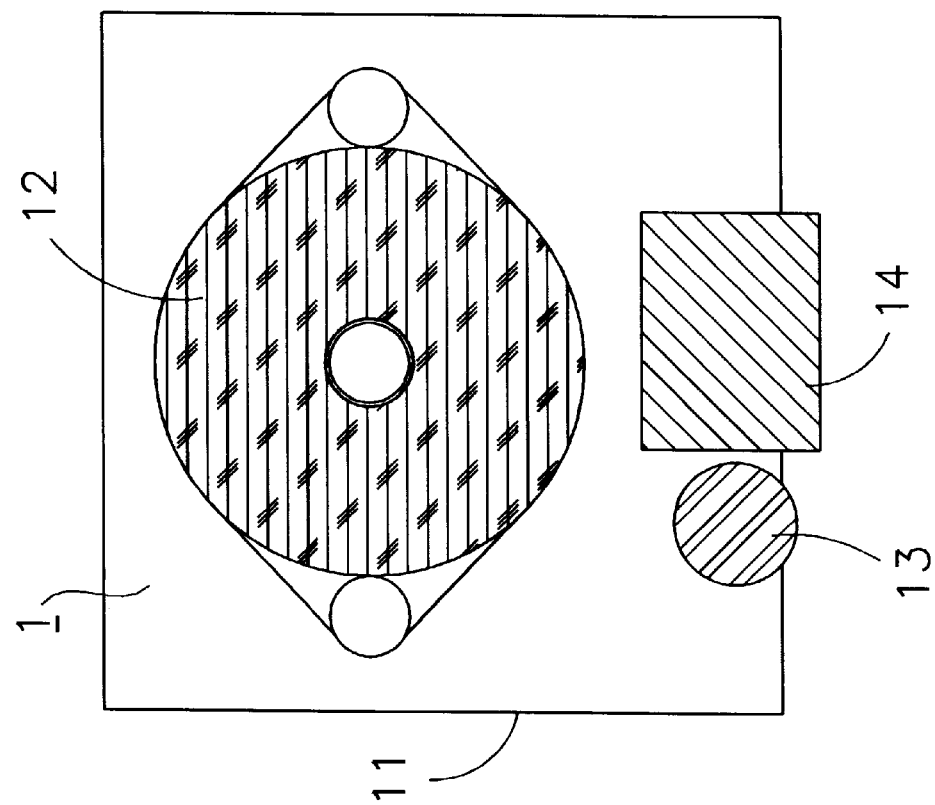

IMAGE SCANNER WITH AUTOMATIC MOVING FUNCTION AND AUTOMATIC SHEET FEEDING FUNCTION

BACKGROUND OF THE INVENTION

1. Field of the Invention

The present invention relates generally to an image scanner having automatic moving function, and more particularly, to an image scanner having automatic moving function which comprises contact image sensor (CIS).

2. Description of the Related Art

Since the depth of focus of CIS is very short, the manufacture of flat-plate image scanner comprising CIS is difficult, therefore, most of these scanners are sheet-feeding type. Automatic moving function are not provided by the conventional image scanners comprising CIS, therefore only single-page documents (e.g. papers or photographs) with limited size can be scanned, while those documents of large size or being bound into books can not.

On the other hand, image scanners comprising CCD and having automatic moving function had been disclosed in the prior art. However, when comparing with those comprising CIS, their construction is more complex, fabrication is more inconvenient, and downsizing is more difficult.

Accordingly, the object of the present invention is to provide an image scanner with automatic moving function which includes CIS and has advantages such as simple construction, small size, being able to scan books and documents with different size, and high image quality.

SUMMARY OF THE INVENTION

The image scanner with automatic moving function according to the present invention comprises: detachably assembled upper base and lower base wherein the upper base and lower base is put together during sheet-feeding scanning and is separated apart during automatic moving scanning in which only the upper base is used.

The upper base further includes: a driving means which feeds the document into the image scanner during sheet-feeding scanning and moves the upper base on the document during automatic moving scanning; and an elastically disposed contact image sensor which protrudes from the underneath of said upper base to contact the document when said upper base is placed on a document during automatic moving scanning.

The sheet-feeding direction makes a small angle with the plane where both lower surfaces of the contact image sensor and the upper base body are situated, and the position where documents initially come in contact with the plane is located behind the front edge of the lower surface of the contact image sensor.

Preferably, the lower base pushes the contact image sensor back in the upper base to make both lower surfaces of the contact image sensor and the upper base be coplanar during sheet-feeding scanning.

BRIEF DESCRIPTION OF THE DRAWINGS

FIG. 2A schematically shows the upper base of an image scanner after the upper and lower bases are separated according to the present invention;

FIG. 2B schematically shows the state that the upper base of the image scanner according to the present invention is used to proceed automatic moving scanning;

DESCRIPTION OF THE PREFERRED EMBODIMENTS

Figure 1:
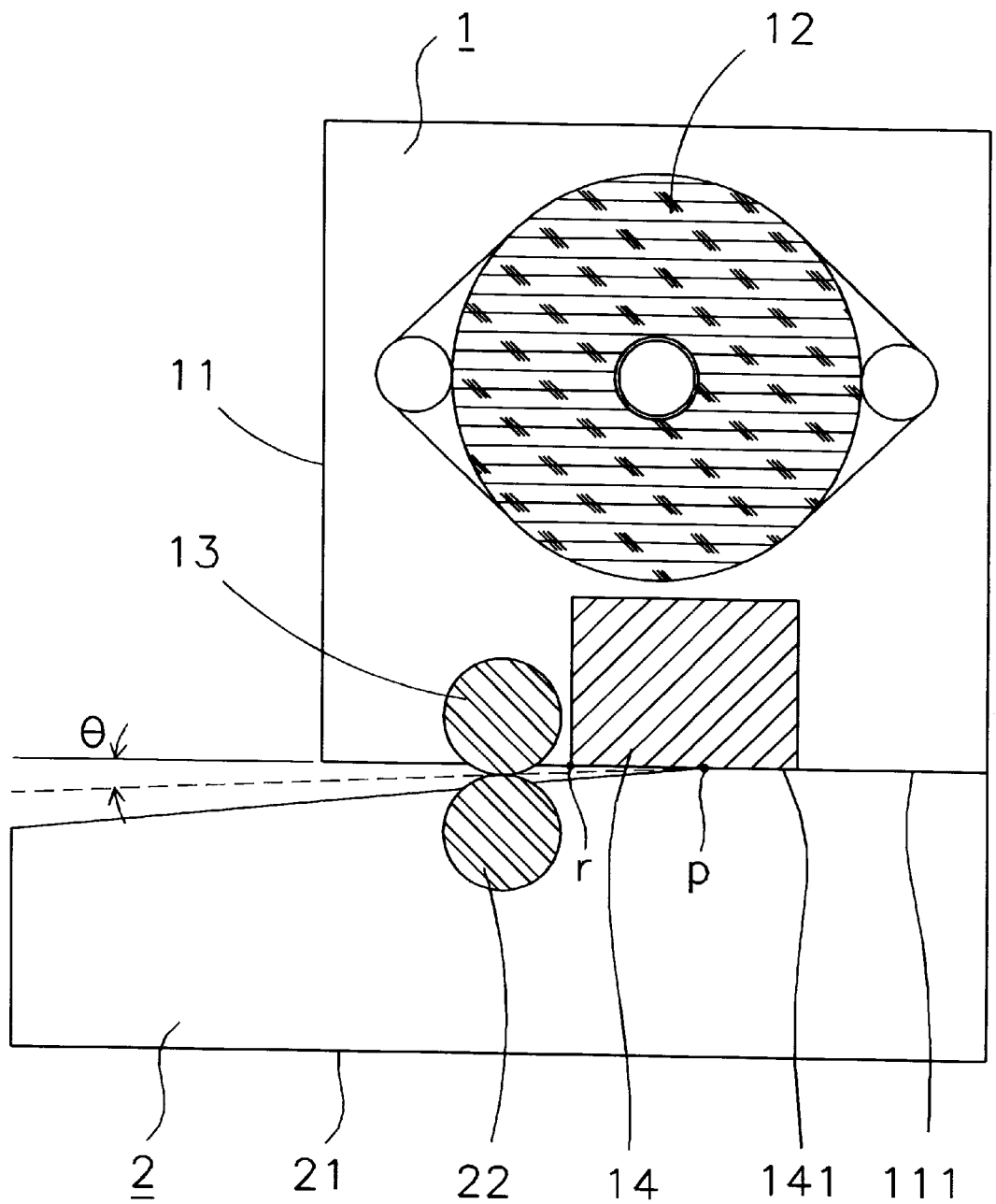
FIG. 1 schematically shows the structure of an image scanner having automatic moving function according to the present invention.

FIG. 1 is a schematic diagram of an image scanner having automatic moving function according to the present invention, wherein the upper base 1 and lower base 2 are detachably assembled, the upper base 1 and the lower base 2 are assembled during sheet-feeding operation and are separated during automatic moving operation in which only the upper base 1 is used. The upper base 1 includes: an upper base body 11, a motor 12, an upper roller 13, and a CIS 14; the lower base 2 includes: a lower base body 21, and a lower roller 22.

A portion of the upper roller 13 extends outside the upper base body 11 and is driven by the motor 12. During sheet-feeding scanning, the upper roller 13, together with the lower roller 22, feeds the documents into the image scanner; during automatic moving scanning, the upper base 1 moves on the document 3 via the upper roller 13 (refer to FIG. 2B).

The CIS 14 is elastically disposed behind the upper roller 13, during automatic moving scanning, the upper base 1 and the lower base 2 are separated and the lower surface of the CIS 14 is slightly lower than the lower edge of the upper roller 13 (FIG. 2A) or they are on the same plane, therefore, when the upper base 1 is placed on the document (FIG. 2B), the CIS 14 is immediately adjacent to the document because it is elastically disposed and pushed against by the document in this case, and the scanned image is of high quality. On the other hand, the upper base 1 and the lower base 2 are put together during sheet-feeding scanning and the CIS 14 is pushed against by the lower base 2 so that its lower surface 141 and the lower surface 111 of the upper base 1 are coplanar.

A portion of the auxiliary roller 22 extends outside the lower base body 21, the auxiliary roller 22 in cooperation with the upper roller 13 feeds documents into the image scanner. Paper is fed from downside to upside with a small angle θ entering the plane where the lower surfaces of both CIS 14 and the upper base 1 are situated. The scanning locus p is positioned on the uncut portion of the upper surface of the lower base 2. Furthermore, the position where documents initially come in contact with the plane sits behind the front edge r of the lower surface of CIS 14, preferably, the position sits in front of the scanning locus p. With this configuration, the situation that sheet-feeding does not make progress smoothly resulting from the front edge of the CIS 14 can be avoided.

Figure 3:
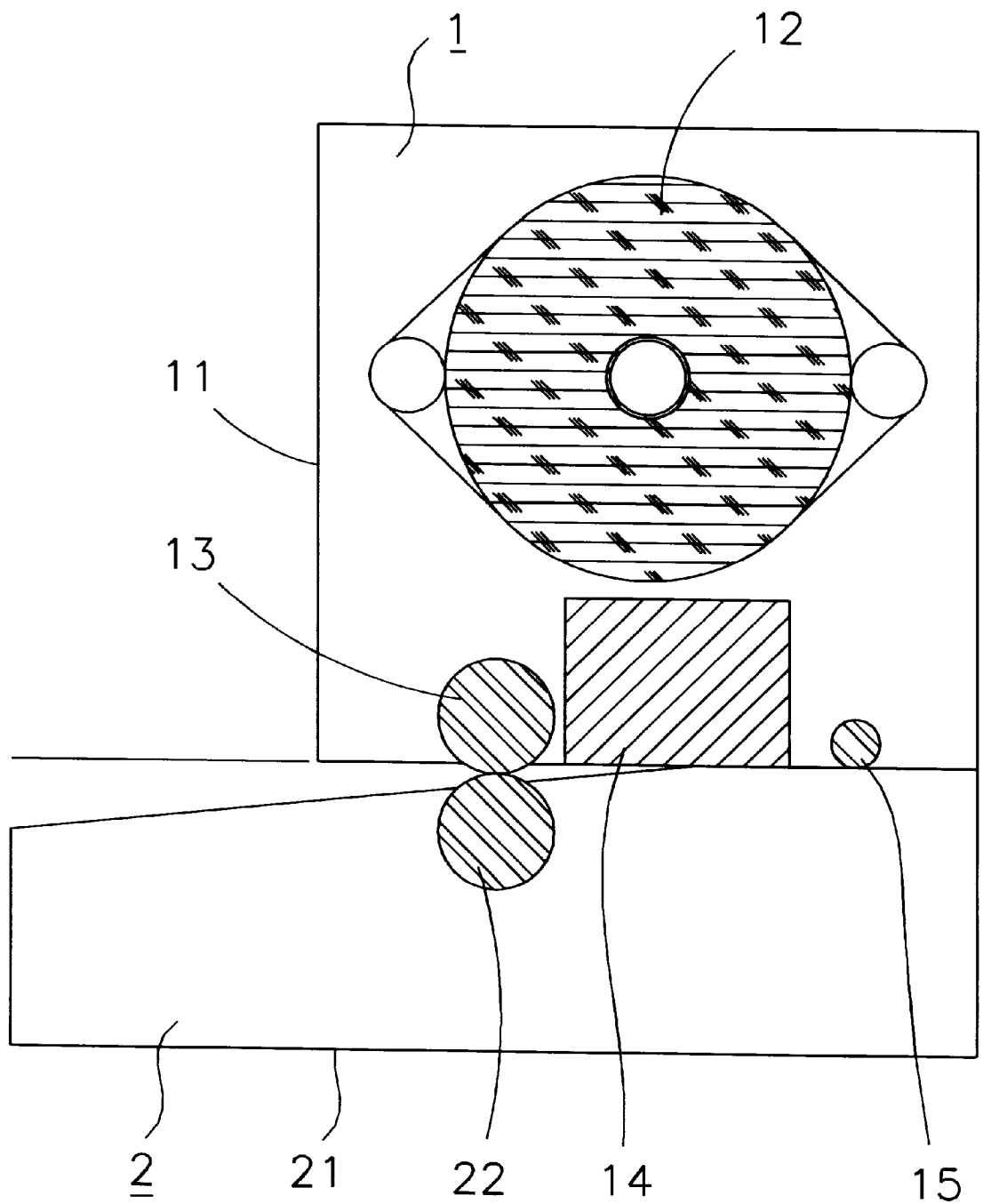
FIG. 3 schematically shows another preferred embodiment of the image scanner according to the present invention.
Figure 4:
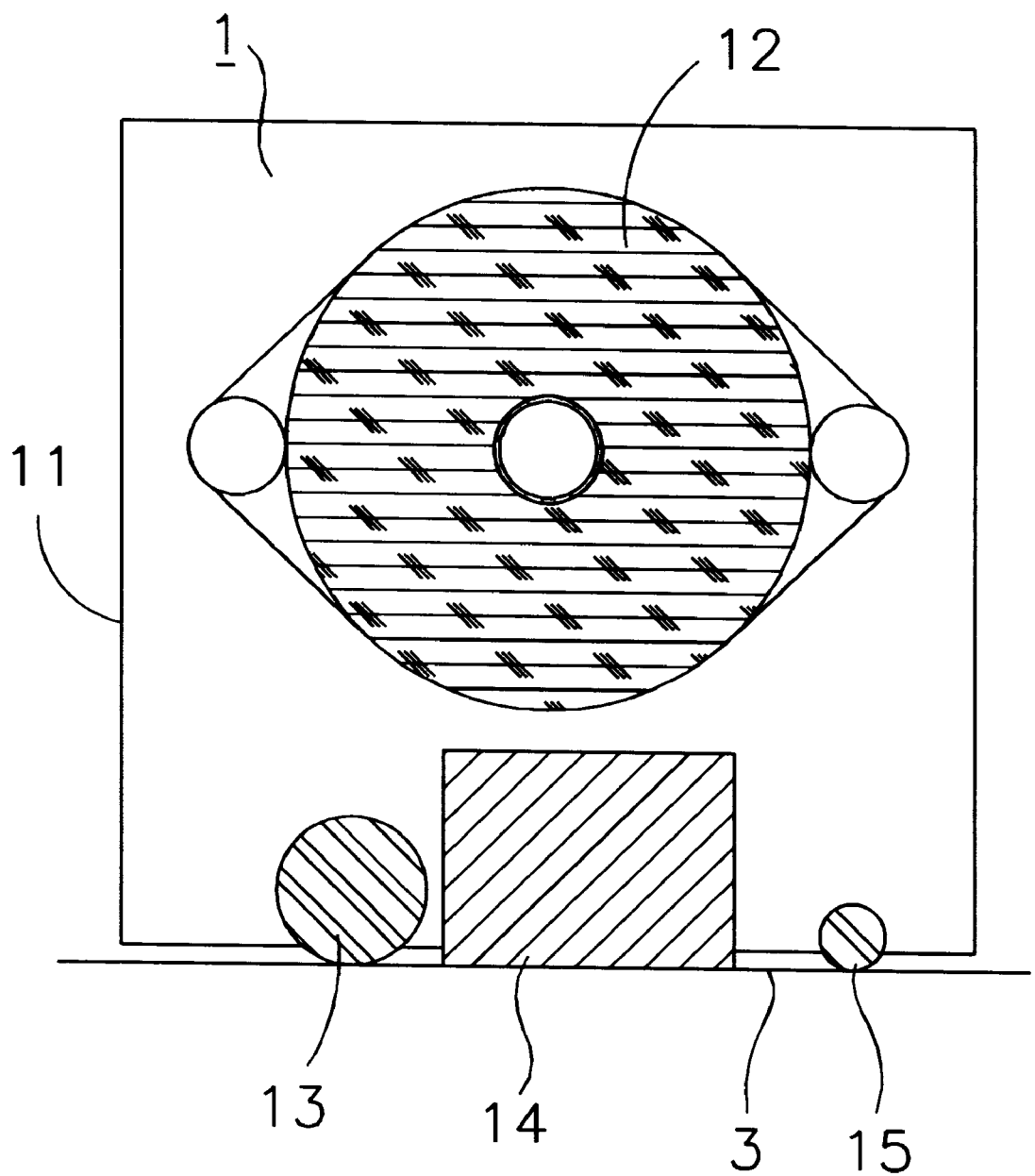
FIG. 4 schematically shows the state that the embodiment shown in FIG. 3 is used to proceed automatic moving scanning.

Referring to FIG. 3, there is shown the structure of another embodiment according to the present invention, wherein the upper base 1 further comprises an upper auxiliary roller 15 located behind the CIS 14, which extends outside the upper base body partially and the lower edge of it is at the same height with the lower edge of the upper roller 13. As shown in FIG. 4, because the CIS 14 is elastically disposed and pushed by the document, the lower edges of the upper roller 13, the CIS 14, and the upper auxiliary roller 15 are coplanar when we put the upper base 1 on the document during automatic moving scanning. The upper auxiliary roller 15 assists the upper roller 13 to direct the upper base 1 to move in a straight path during automatic moving scanning. In addition to the auxiliary function, roller 15 can also be driven by the driving motor 12 to move the document actively.

Figure 5:
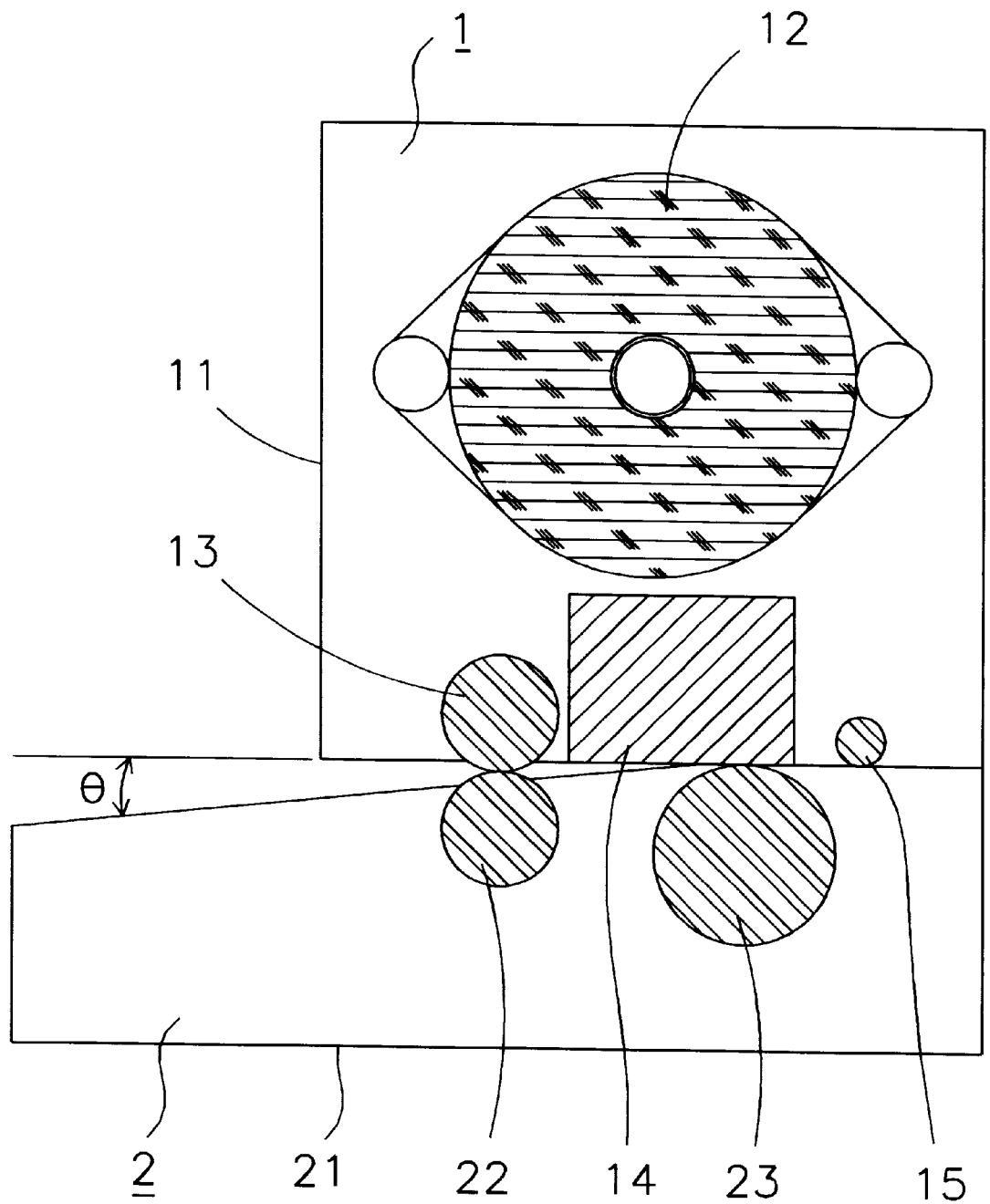
FIG. 5 schematically shows yet another preferred embodiment of the image scanner according to the present invention.

Referring now to FIG. 5, there is shown the structure of yet another preferred embodiment of the present invention, wherein the lower base 2 further includes a lower driving roller 23 to feed paper smoothly into the image scanner during sheet-feeding scanning when the upper base is assembled with the lower base. In this case, the motor 12 drives the roller 15 instead of roller 13 to move the document. When the upper base 1 is put on the document, the driving roller 15 moves the upper base 1 along the surface of document during automatic moving scanning.

Besides, the image scanner having automatic moving function according to the present invention is preferred to have an angle θ of paper feeding direction less than 10°.

Figure 6:
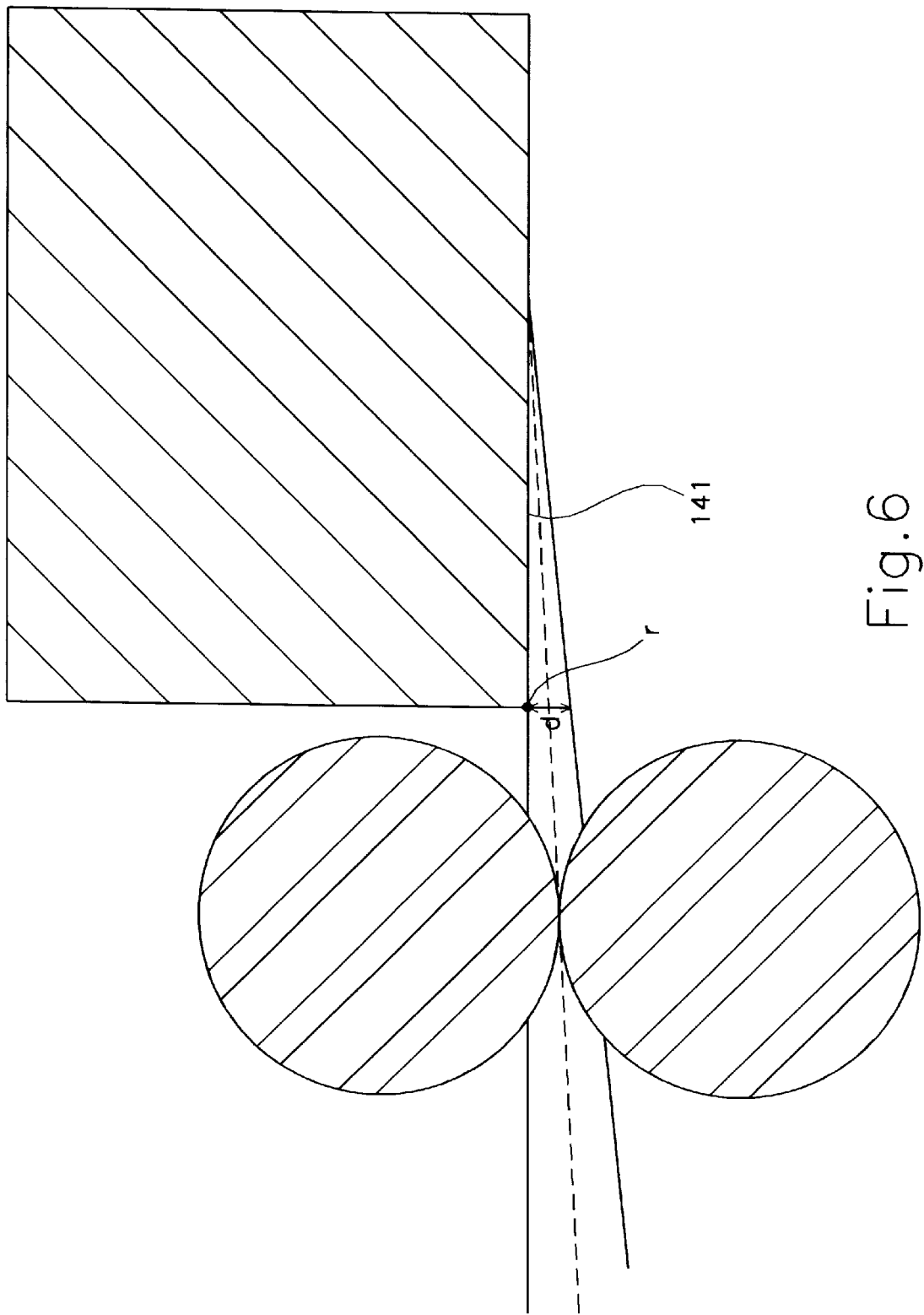
FIG. 6 shows the partly enlarged view of the image scanner according to the present invention.

Additionally, referring to FIG. 6, the image scanner having automatic moving function according to the present invention is preferred to have the vertical distance d between the front edge r of lower surface 141 of the CIS 14 and the upper surface of the lower base body no less than 1 mm (d>1 mm).

Figure 7:
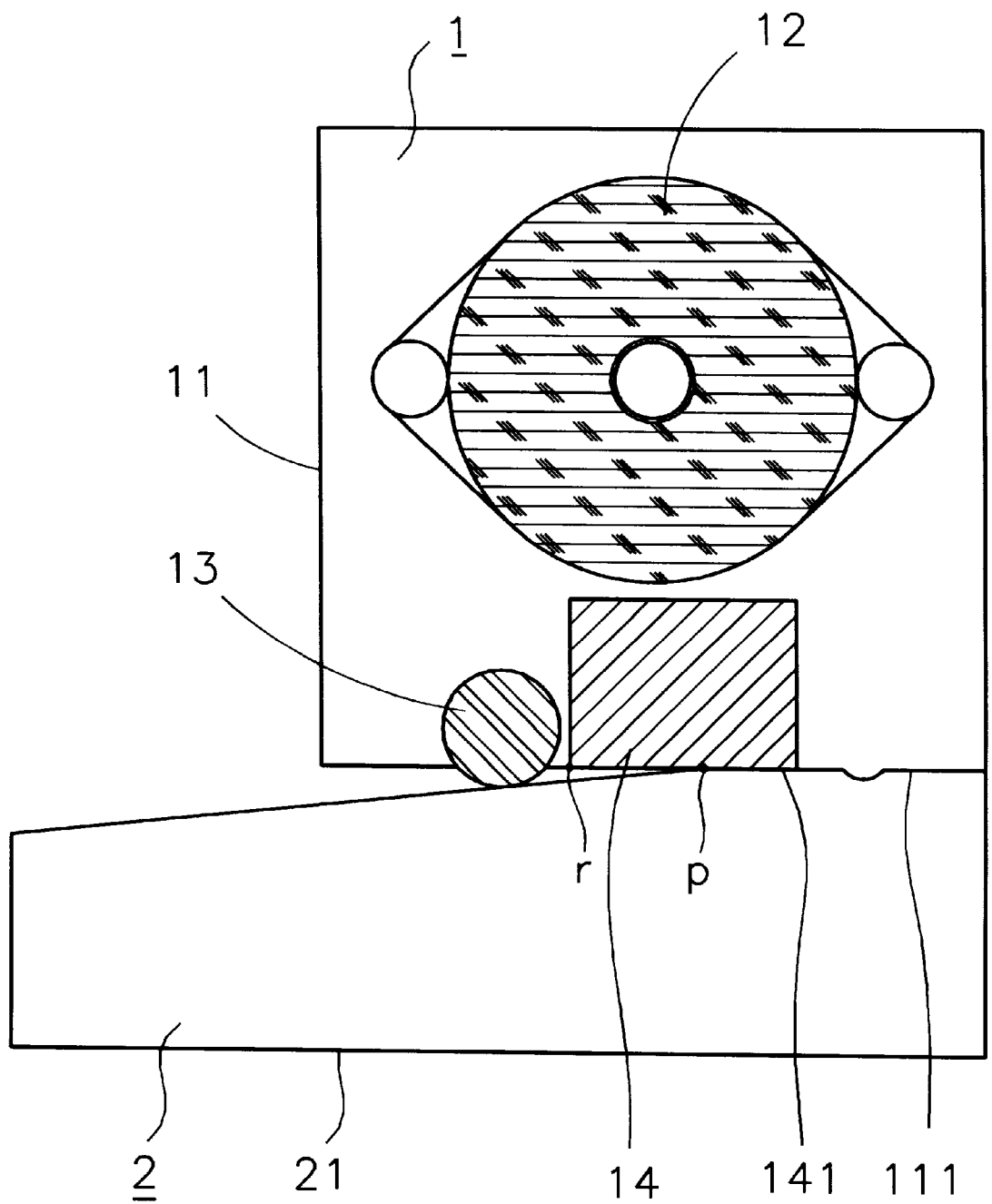
FIG. 7 schematically shows yet another preferred embodiment of the image scanner according to the present invention.

FIG. 7 shows the structure of yet another embodiment of the present invention. The aforesaid roller 22 of lower base 2 no longer exists. The document is moved only by the driving roller 13 on the smooth surface of lower base 2 without assistance of other roller during sheet-feeding scanning.

While the present invention has been described with reference to the specific embodiments, the description is only illustrative of the present invention and is not to be construed as limiting the invention. Various modifications and applications can be made without departing from the spirit and scope of the present invention as defined by the appended claims.

I claim:

1. An image scanner with automatic moving function, comprising:

detachably assembled upper and lower bases, said upper base and said lower base being put together during sheet-feeding scanning and being separated apart during automatic moving scanning in which only said upper base is used, said upper base further includes:

driving means for feeding a document into said image scanner during sheet-feeding scanning and moving said upper base on the document during automatic moving scanning; and an elastically disposed contact image sensor which protrudes from underneath of said upper base to contact the document when said upper base is placed on the document during automatic moving scanning;

wherein the sheet-feeding direction is angled with respect to a lower surface of said contact image sensor, and a leading edge of the document first comes in contact with said lower surface of the contact image sensor behind the front edge of the lower surface of said contact image sensor.

2. The image scanner as described in claim 1 wherein said lower base pushes said contact image sensor back in said upper base to make both lower surfaces of said contact image sensor and said upper base be coplanar during sheet-feeding scanning.

3. The scanner as described in claim 1 wherein documents are fed into the image scanner along the upper surface of said lower base, said upper surface where documents pass by includes a slant face which makes the small angle with the lower surface of said contact image sensor, the top end of said slant face is located behind the front edge of said contact image sensor.

4. The image scanner as described in claim 3 wherein a side view of said lower base appears as a rectangle with one front corner cut off.

5. The image scanner as described in claim 1 wherein said driving means comprises a driving motor and a set of rollers, said set of rollers is composed of a single roller or a plurality of rollers and at least one of said set of rollers is driving roller, and said driving roller is driven by said driving motor.

6. The image scanner as described in claim 5 wherein said driving roller is immobilized.

7. The image scanner as described in claim 5 wherein said driving roller is set in front of said contact image sensor.

8. The image scanner as described in claim 7 wherein a portion of upper surface of said lower base where the documents pass by is a smooth surface.

9. The image scanner as described in claim 7 wherein said lower base further comprises an auxiliary roller tangent to said driving roller for assisting said driving roller to feed documents into the scanner.

10. The image scanner as described in claim 7 wherein said upper base further comprises a second driving roller that is set behind said contact image sensor and being driven by said driving motor.

11. The image scanner as described in claim 5 wherein said driving roller is set behind said contact image sensor, said lower base further comprises a lower driving roller tangent to said contact image sensor, which feeds documents into the image scanner in cooperation with said driving roller.

12. An image scanner as described in claim 1 wherein the angle between said sheet-feeding direction and said lower surface of said contact image sensor is smaller than 10°.

13. An image scanner with automatic moving function, comprising:

detachably assembled upper and lower bases, said upper base and lower base being put together during sheet-feeding scanning and being separated apart during automatic moving scanning in which only said upper base is used, said upper base further includes:

driving means for feeding a document into said image scanner during sheet-feeding scanning and moving said upper base on the document during automatic moving scanning; and an elastically disposed contact image sensor which protrudes from the underneath of said upper base to contact the document when said upper base is placed on the document during automatic moving scanning;

wherein the sheet-feeding direction is angled with respect to a lower surface of said contact image sensor, and the a leading edge of the document comes in contact with said lower surface of the contact image sensor behind the front edge of the lower surface of said contact image sensor, and said lower base pushes said contact image sensor back in said upper base to make both lower surfaces of said contact image sensor and said upper base be coplanar during sheet-feeding scanning, and the angle between said sheet-feeding direction and said lower surface of said contact image sensor is smaller than 10°.

* * * * *